US012331578B2

(12) United States Patent
Hauri et al.

(10) Patent No.: US 12,331,578 B2
(45) Date of Patent: Jun. 17, 2025

(54) METHOD AND APPARATUS FOR OPERATING AN AUTOMATIC DOOR SYSTEM

(71) Applicant: AGTATEC AG, Fehraltorf (CH)

(72) Inventors: Marco Hauri, Galgenen (CH); Alexander Beck, Zurich (CH)

(73) Assignee: Assa Abloy Entrance Systems AB, Landskrona (SE)

(*) Notice: Subject to any disclaimer, the term of this patent is extended or adjusted under 35 U.S.C. 154(b) by 96 days.

(21) Appl. No.: 17/924,801

(22) PCT Filed: May 6, 2021

(86) PCT No.: PCT/EP2021/061967
§ 371 (c)(1),
(2) Date: Nov. 11, 2022

(87) PCT Pub. No.: WO2021/233687
PCT Pub. Date: Nov. 25, 2021

(65) Prior Publication Data

US 2023/0193685 A1 Jun. 22, 2023

(30) Foreign Application Priority Data

May 19, 2020 (DE) ..................... 10 2020 113 501.7

(51) Int. Cl.
*E05F 15/74* (2015.01)
*E05F 15/605* (2015.01)
(Continued)

(52) U.S. Cl.
CPC ............ *E05F 15/74* (2015.01); *E05F 15/605* (2015.01); *E05F 15/611* (2015.01);
(Continued)

(58) Field of Classification Search
CPC ....... E05F 15/74; E05F 15/605; E05F 15/611; E05F 15/632; E05F 15/73; E05Y 2400/415; E05Y 2400/356; E05Y 2900/132
See application file for complete search history.

(56) References Cited

U.S. PATENT DOCUMENTS 5,369,912 A * 12/1994 Ginzel .................. E05F 15/611 49/260
5,647,074 A * 7/1997 White, Jr. ............... E03D 9/002 4/312
(Continued)

FOREIGN PATENT DOCUMENTS

DE 19613178 10/1997
DE 102008008142 8/2009
(Continued)

OTHER PUBLICATIONS

International Search Report in PCT/EP2021/061967 mailed Aug. 1, 2021.
German Search Report in 10 2020 113 501.7 mailed May 19, 2020.

*Primary Examiner* — Rina I Duda
(74) *Attorney, Agent, or Firm* — Wissing Miller LLP

(57) ABSTRACT

An improved method and an improved apparatus for operating an automatic door system are distinguished by the following features, inter alia: —a sensor device (9) is used, which implements a monitoring region (19) assigned to and/or disposed upstream of the leaves (1; 1*a*, 1*b*) for the detection of objects (P, G) which are situated and/or moving in said monitoring region (19), —by means of the sensor device (9) and/or by means of the control and/or evaluation device (11), an object (P, G) situated in the monitoring region (19) is detected with regard to the position and direction of movement of said object and also with regard to the width, size and/or contour (K) or overall contour (23) of
(Continued)

said object, and —depending on the movement-dependent position and direction of movement (21) and also the width, size and/or contour (K) or overall contour (23) of the detected object (P, G), the at least one leaf (1; 1*a;* 1*b*) is moved, in particular opened, readjusted and/or closed, in an object-related manner.

16 Claims, 10 Drawing Sheets

(51) Int. Cl.
*E05F 15/611* (2015.01)
*E05F 15/632* (2015.01)

(52) U.S. Cl.
CPC ......... *E05F 15/632* (2015.01); *E05Y 2400/35* (2013.01); *E05Y 2400/415* (2013.01); *E05Y 2900/132* (2013.01)

(56) References Cited

U.S. PATENT DOCUMENTS

| | | | | | |
|---|---|---|---|---|---|
| 6,084,367 | A * | 7/2000 | Landert | E05F 15/608 318/283 |
| 6,470,952 | B1 * | 10/2002 | Cline | E05D 15/266 160/199 |
| 6,910,301 | B2 * | 6/2005 | Kalempa | E06B 7/16 49/367 |
| 7,324,894 | B2 * | 1/2008 | Urman | E05F 15/50 49/31 |
| 8,819,992 | B2 * | 9/2014 | De Coi | E05F 15/43 49/25 |
| 2001/0048470 | A1 | 12/2001 | Lampert | |
| 2006/0086050 | A1 * | 4/2006 | Matsuyama | E05B 41/00 49/366 |
| 2007/0094932 | A1 | 5/2007 | Hoshide | |
| 2007/0108927 | A1 * | 5/2007 | Valencia | E05F 15/73 318/282 |

FOREIGN PATENT DOCUMENTS

| | | |
|---|---|---|
| DE | 102016119339 | 4/2018 |
| KR | 20130045627 | 5/2013 |
| WO | 2006033145 | 3/2006 |

* cited by examiner

METHOD AND APPARATUS FOR OPERATING AN AUTOMATIC DOOR SYSTEM

This application is a 371 of PCT/EP2021/061967, filed on May 6, 2021, published on Nov. 25, 2021 under publication number WO 2021/233687, which claims priority benefits from German Patent Application No. 10 2020 113 501.7, filed on May 19, 2020, the disclosure of which is incorporated herein by reference.

The invention relates to a method and to an apparatus for operating an automatic door system with at least one movable, adjustable and/or pivotable door leaf.

BACKGROUND OF THE INVENTION

Field of the Invention

It is known that in automatic door systems (above all also in automatic sliding door systems), the region in front of the door, including at least one sliding door leaf, is monitored by acquisition and/or monitoring means, in order to then correspondingly control the preferably automatic door or sliding door drive by means of an evaluation and/or control device.

DESCRIPTION OF RELATED ART INCLUDING INFORMATION DISCLOSED UNDER 37 CFR 1.97 AND 1.98

The mentioned acquisition and/or monitoring means are commonly also referred to in general as "sensors" or "motion detectors." They can be constructed separately or jointly.

The sensors, sensor devices or in general the monitoring and acquisition means, in particular for the control and monitoring of doors, differ with regard to their technical function or application.

Motion detectors usually operate according to the Doppler principle, i.e., that a signal is emitted into the monitoring and/trigger range of the door to be monitored (regardless of whether it is a leaf door, a sliding door, a revolving door or the like) is emitted and the reflected signal is received and evaluated. If the signal encounters a moved object, then, depending on the relative movement of the moved object toward or away from the transmitter, a frequency shift results. In principle, such motion detectors can operate on the basis of ultrasound, light in the infrared range or according to the radar principle.

In addition, so-called state detectors are known, which are also based on the different technical principles and commonly operate in the infrared range. Here, as a rule, state detectors which evaluate the so-called active infrared signals are used. By measurement of the signal emitted in the monitoring and trigger range by the sensors and detectors, depending on the varying intensity of the reflected signal, a corresponding evaluation and actuation of the door to be opened and closed can be carried out.

Furthermore, it is known to use as sensor devices at least one distance sensor which, for example, consists of a transmission device with at least one transmitter for transmitting an electromagnetic signal and a receiving unit with at least one receiver for receiving the reflected signal. By means of the provided control and/or evaluation device, the transit time of the signal emitted by the transmission device and reflected by an object to be monitored can be measured directly or indirectly, wherein, from this data, in the end, the distance to the object can be derived. In other words, in the end, the distance measurement is a direct or indirect evaluation of the transit time of the signal and/or phase and/or frequency and/or frequency modulation or the variation thereof in comparison to the emitted signal. Such sensors are commonly referred to as "Time of Flight" sensors or in short as ToF sensors.

Here, from DE 10 2008 008 142 B4, it is also disclosed that by means of a suitable transmission device, the direction of an object situated in a monitored region and moving in this region can be detected or determined, for example, by calculation of a sum or difference between two individual spatial coordinates of the moving object.

A method for operating a door system and a door system operating according to the method have also been disclosed, for example, from DE 196 13 178 A1.

Shown and described are different door systems such as, for example, sliding door systems and revolving doors.

The door leaves or the door elements are intended to be controlled depending on a process which coordinates at least one higher-level program module in such a manner that predetermined criteria are optimally met taking into consideration the traffic situation and/or environmental conditions acquired by the sensors/. The predeterminable criteria include, for example, the input capacitance, heat losses, safety, etc. The parameters in case of the traffic situation include, for example, the density, the space requirement, the direction of movement of objects, their speed, etc. The environmental conditions include the temperature, the wind, the pressure differences or also an air renewal requirement, etc.

In an embodiment example, it is shown that in the region of a doorway multiple door elements which are vertically arranged over one another and which are motor driven and controlled separately can be used, which, under the control of a control device, are opened only to such an extent and only for as long as is minimally necessary for the passage of a person. Here, each door element is movably driven in horizontal direction separately from other similarly designed door elements. The individual door elements therefore can be actuated individually or in groups.

In WO 2006/033145 A1 as well as in DE 196 13 178 A1, it is proposed to use a door system which includes a plurality of horizontally running slats arranged over one another or vertically running slats arranged horizontally next to one another, for opening and closing the doorway. The individual slats can be adjusted individually and independently of one another between their closed position and their open position, so that, for example, the individual slats have to be moved in the open position only to the extent that an object, in accordance with its outer contour, can be moved through the door in a collision-free manner through the door or can move in a collision-free manner.

In the last mentioned DE 196 13 178 A1 as well as in US 2007/0094932 A1, it is moreover shown and explained how, for example, two or more sliding door leaves can be asymmetrically adjusted in the open position. Thereby, it is possible to open a sliding door only in the region in which an object is actually moving through the door opening region. In this embodiment example, the door opens to such an extent that an object approaching the door can pass through the door in a collision-free manner in accordance with its width. As usual, after the object leaves the door region, the door is then closed again.

The aim of the present invention is to improve a corresponding control for leaves, in particular for door leaves.

BRIEF SUMMARY OF THE INVENTION

The aim is achieved according to the invention with regard to the method in accordance with the features disclosed below and with regard to the apparatus in accordance with the features disclosed below. Advantageous embodiments of the invention are indicated in the dependent claims.

In the context of the present invention, a clear improvement in comparison to previous door control methods and door control apparatuses is implemented.

In the systems known to date, it is always provided that, depending on a moved object detected in a monitoring region, the door is opened, and after lapse of a time control it is closed again, provided no object is situated in the monitored region.

Here, for example, in the prior published DE 10 2008 008 142 B4, it is also described that not only is the presence of an object in a monitoring region to be detected but also that its direction of movement can be acquired so as to, for example, not only open the door as a function thereof but also, for example, to carry out a cross-traffic suppression. The "cross traffic suppression" feature is then engaged as a rule, according to this aforementioned prior publication, when the radar is oriented on a path or even on a footway which leads past the door (at least approximately past the door). In this case, the door should only be opened when a person wishes to pass through the door and not when a person wishes to walk past the door on the path or footway. Here, by the corresponding evaluation and direction recognition associated therewith, the mentioned cross-traffic suppression can then be carried out depending on the direction recognition.

However, should it be recognized that the moved object moves toward the door, said door is then completely moved into the open position and, as mentioned, after lapse of a time control, is returned again into the closed position, provided no other object moving toward the door is detected.

Independently of the 100% open position, it is also known, for example, in the case of the detection of an object moving toward the door, to open the door only up to a certain pre-adjustable value or position, for example, 75%. Here, sometimes the term "winter opening width" or "reduced opening" is used. Thereby, for example, in winter, a lower heat exchange is intended to be achieved in order to save energy.

In addition, DE 196 13 178 A1 also only describes that, depending on an object, the multiple door elements arranged over one another, which can be moved separately between their open and closed positions, are opened only to such an extent necessary for a person to pass through the door. This means that, depending on these parameters, the door is correspondingly opened until the person has passed through the door, and then it is closed again.

In contrast to this, the invention now proposes to carry out the opening movement and/or the closing movement of a one-leaf or multiple-leaf door at least in a time and/or movement period not or not only depending on the position of a detected moved object and/or the direction of movement of the detected object and also not or not only depending on the width and/or contour of the object/objects moving through the door and/or its relative position with respect to the at least one or the multiple leaves or door leaves but rather to carry out the opening movement and/or closing movement depending on the detected object, in such a manner that the respective degree and/or the respective extent of the opening movement and/or the closing movement in at least in a time and/or movement period, occurs depending on the effective or current width, size and/or contour or overall contour with respect to the door opening region of an object moving through the door opening region. Here, this effective or current width, size and/or contour or overall contour with respect to the door opening region changes during the movement process of the object through the door opening region.

In other words, the invention proposes that, in the case of an at least one-leaf door, depending on the current relevant width, size and/or contour or overall contour of the detected object with respect to the door opening region, which change during the movement process through the door opening region, the door leaf is accordingly moved or follows and thus, during the opening and/or closing process, is preferably permanently open, closed again or remains in its open position, depending on whether the section of the object respectively currently plunging into the door opening region and moving through the door opening region becomes wider or smaller or its width remains the same for a certain movement phase.

Here, this can occur in such a way that a preferably predeterminable lateral side or safety spacing between the object moving through the door and the main closing edge of the at least one door leaf is preferably maintained in each phase. Thus, the opening width of the door leaf (leaves) changes, for example, at least in sections during the movement of a person through the opening region of the door.

If, for example, in the case of a two-leaf door, a moved object is moved toward only one leaf which in its readjusting and open position can be open at least to the extent that the object here can pass through the opened door, only one of the two leaves would, for example, be adjusted in the open position, while the other leaf remains in its closed position.

If a moved object is moved off center, for example, toward a two-leaf door, one of the leaves would open to a greater extent than the other leaf, so that the moved object can pass through the door leaves in a collision-free manner. Here, the degree of opening movement and width of the respective door leaf would thus occur so that the object in question can pass through the door in a collision-free manner without colliding with the door leaves or the main closing edges.

The respective door leaf can thus be adjusted to such an extent that its main closing edge always is always adjusted and opened to a greater extent by a preferably predeterminable and/or presettable value of, for example, 10 cm or 15 cm, etc., than would be necessary in principle with respect to the width of the object moving through the door.

However, the corresponding effects also apply likewise in the case of a one-leaf door which would then open depending on the position, size and contour of the object passing through the door only to such an extent that, depending on the direction of movement and size/contour of the object, a collision-free passage through the only partially opened door is possible.

The corresponding effect also applies likewise in mechanically coupled door leaves, wherein the opening of the doors is opened only to such an extent as to implement the same aforementioned advantages.

Finally, the solutions according to the invention also apply to the case of a folding door, wherein the one-leaf folding door or, for example, the two-leaf folding door could open to different extents in order to implement the same aforementioned advantages.

Likewise, this also applies to a swing door, wherein a one-leaf swing door or, for example, a two-leaf swing door can be actuated so that the individual swing-door leaves are opened only to such an extent, and here under some circumstances also to different extents, that a collision-free and unimpeded passage through the doors is possible.

In addition, this also applies to airlock controls or pedestrian flow control systems which use leaves for object flow control.

By means of the solution according to the invention, it is thus possible to implement the door control effectively in such a way that it is adapted to the contour of an object passing through the door. To that extent, the term object-related door control is also used.

For example, if a person passes through the door with a suitcase in tow, then the door leaves could first be increasingly opened in an object-related manner, for example, only to the extent that the person in question can pass through the door in a collision-free manner in each phase of passage through the door opening region, wherein, when the suitcase arrives in the immediate region between the main closing edges of a two-leaf door, a further actuation of the door leaves occurs in such a manner that, in the end, only the suitcase continues to be pulled farther through the door in a collision-free manner.

In the case of such a "width acquisition" or acquisition of the "contour" of an object moving through the door, the closing movement can then also be started relatively early and the door leaf (leaves) can thus continue to follow in an object-controlled manner in the closing direction when the object moving through the door is still situated in the immediate region between the main closing edges and is just in the process of leaving this region. The smaller the relevant or effective width or size of the object in the door opening region, for example, between two main closing edges facing one another, is or becomes, with which the object still enters the immediate door opening region, the smaller the actual opening width of the door or the spacing between the door leaves or, for example, their main closing edges is when the at least one door leaf correspondingly follows or is readjusted.

In contrast to a closing as in the prior art, which always occurs only after lapse of a time control or after a detection signal indicating that the object has left the door opening region, according to the invention a very prompt and, for example, continuous closing is possible, which already starts when the object is still situated in the door opening region. Thereby, the energy exchange is also reduced and, precisely in airlocks, their safety function is improved.

Corresponding measures can be taken for the opening movement. The farther an object moving through the door plunges into the immediate door opening region, and thus the wider and greater the section of the object entering this region is, the further the at least one door leaf is moved and readjusted in the opening direction.

However, likewise, the control can occur depending on the maximum width/contour of an object or a combined number of objects (in particular several persons walking closely next to one another) with a more complex "contour," for example, when a suitcase is pulled on one side of the body. In other words, the width can be set so that, both for a person passing through the door and also for the suitcase pulled through on one side, it is held open at the desired width until the person with the suitcase has entirely passed through the door.

However, "intelligent control methods" are also possible, in such a manner that, after an object which has already been moved entirely through the door has left the immediate door region, the door is not immediately closed since, for example, in the immediate vicinity, a next object moving toward the door has already been recognized and detected.

If need be, it is possible in principle to leave open or reset at least one leaf or preferably the at least two leaves, so that the opening region is effectively provided and made available at the site where the next detected object is moving.

In summary, it can thus be retained that, in the context of the present invention, an individual opening and/or closing of an automatically driven door with at least one leaf and preferably with at least two leaves is made possible. Here, a certain object, for example, a person that would like to pass through a door, can be detected. Depending on the attributes of this object, i.e., its position, its movement speed, its direction of movement but also its size or width, orientation and contour (that is to say generally speaking viewed in cross section parallel to the floor surface), the door is then individually opened depending on these attributes and readjusted in all the directions during the passage through. This means that, one the one hand, only the door leaf of multiple door leaves toward which the person in question is moving and wants to pass through the door is opened, so that the other door leaf can remain closed. If the person moves overall more or less toward the both leaves but not toward the center, one door leaf is opened to a greater extent than the other leaf. If more than 50% of the person has already passed through the immediate door region, the door can even start to close again, in that effectively the circumference or the contour of the object is followed at a predetermined distance. Thereby, not only is a prompt door opening possible, which is optimally adapted to the object passing through the door, also above all a door closing and readjustment are possible, whereby, for example, in particular in winter months, an energy-saving opening and closing of the door is possible and the separation safety in airlock application is increased.

The already mentioned side and/or safety spacing between the main closing edges and the object passing through the door can here also be set differently during the individually adapted opening and closing movement or can be calculated in an object-related manned on the basis of rule sets and/or experimental values.

If the temperatures in the outside and inside region of the building are in an at least similar range, this spacing can be set or automatically actuated to be greater, for example, depending on a temperature sensor inside the building as well as outside the building (that is to say in the case of a small temperature difference between inside and outside). If, above all in the winter months, the temperatures are clearly lower outside than in the heated building, or if the outside temperatures in the summer months are clearly higher compared to the temperatures inside the building, the opening and closing movements can be set so that the main closing edges are only opened to a lesser extent, so that the spacing between the opened main closing edges and the contour of the person is smaller.

Finally, such a different setting of the opening width and thus of the spacing of the respective main closing edge from the object in question could be set or calculated to be greater with respect to a moving person than, for example, with respect to an object such as, for example, a suitcase, pulled behind by the person in question. A distinction between persons or animals passing through the door or objects can also be determined or detected by corresponding sensors and therefrom the door movement can be derived in an object class-specific manner.

BRIEF DESCRIPTION OF THE DRAWINGS

Additional advantages, details and features of the invention result from the following description of embodiment examples. The figures show in detail.

DETAILED DESCRIPTION

Figure 1:
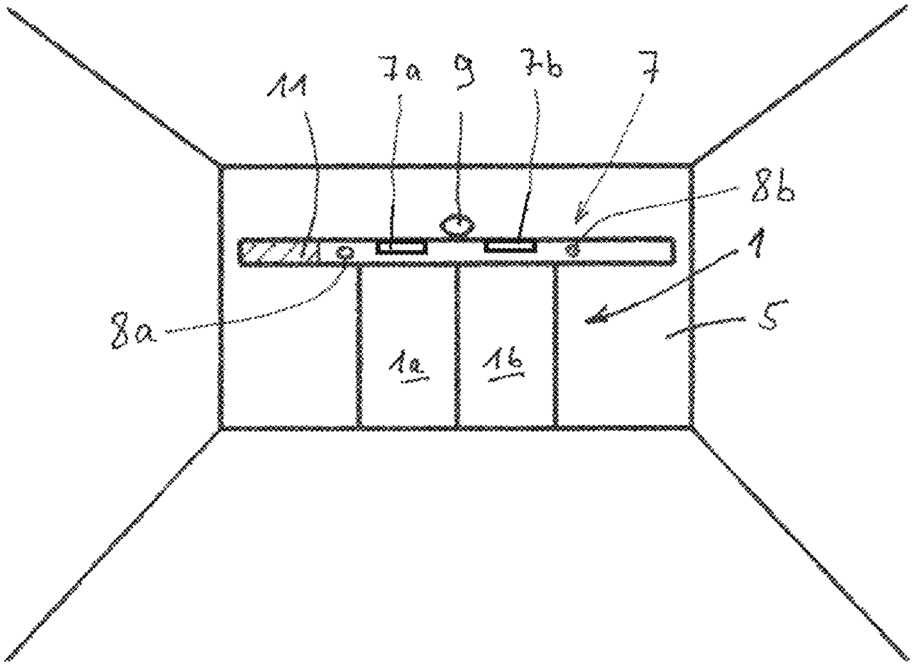
FIG. 1: a diagrammatic front view of a two-leaf sliding door arrangement with a sensor device situated above.

In FIG. 1, in a diagrammatic representation, a two-leaf sliding door 1 with two door leaves 1*a*, 1*b* is shown in closed state. The door is provided, for example, in a wall 5.

The door leaves 1*a*, 1*b* are movably held in a known manner via a guide rail arrangement extending horizontally above the door opening and designated with reference numeral 7 in FIG. 1, with the associated drive devices and drive components (provided jointly with reference numeral 7 in FIG. 1) and are moved, for example, via two drives not shown in greater detail between an open position and a closed position. The transfer of the direction of movement from the respective drive to the associated leaf can here occur, for example, via two separate toothed belts. To that extent, reference is made to known sliding door systems.

In the present case, for each separately actuatable door leaf, a separate drive device 7*a* or 7*b* is provided, which, for example, likewise in turn each can comprise at least one respective motor 8*a*, 8*b* (in the case of a redundant drive, for example, in each case two motors, etc.) which for example then actuates, via the mentioned belt drive separately associated with it, the sliding door leaf 1*a* or 1*b* associated with it.

This construction in principle makes it possible that each leaf separately from the other can be separately actuated and moved, i.e., can be moved also to different extents in the open position and/or in its closed position, and namely independently of the respective other sliding door leaf.

In the embodiment example shown, above the door opening, that is to say, for example, in the region of the suspension and running arrangement of the movable door leaves 1*a*, 1*b*, a sensor device 9 is provided, which, however, in principle, can also be positioned at a completely different site, for example, also on the ceiling, etc.

The sensor device 9 itself can here include multiple sensors, including multiple sensors based on different technologies. Here, it should be preferable to use a sensor device which, in the end, in general can be referred to as acquisition system or distance sensor, or which includes at least one acquisition sensor or distance sensor and can acquire the object width, that is to say, for example, the object size in terms of width extension as well as the position. Thus, here, one or more acquisition or distance sensors of this type can be provided or else one or more acquisition or distance sensors can be provided in addition to other additional sensors based on other technologies, as also discussed above.

Such acquisition and/or distance sensors can be, for example, so-called "Time of Flight" sensors which are also referred to in abbreviated form as ToF sensors. Here, for example, it is a matter of sensors which include at least one sensor device with at least one transmitter with, for example, a light source and at least one receiving device with at least one receiver. By means of an additionally provided control and/or evaluation device 11, via an acquisition sensor of this type, not only the position of a sensor to be detected in the monitoring region in relation to the door or to the respective door leaf but also its movement direction and, in the end, also its width, size and/or its contour can then be acquired. For the following description, above all in sliding or folding doors, the contour in relation to the door leaf plane (in closed position) is important, as will later result from the description below.

By means of the acquisition sensors, for example, the selected ToF sensors, or by means of at least one ToF sensor provided, it is here possible, using the transmitter, to emit signals in direction of the object to be monitored and then to pick up the signal reflected by the monitored object to be detected in order to then finally acquire from the received signal, in particular the transit time or a phase position of the signal, the distance between the at least one ToF sensor and the object detected in the monitoring region. To that extent, reference is made to known ToF sensors or ToF sensor devices and FMCW sensor devices, including their operating principle.

Figure 2A:
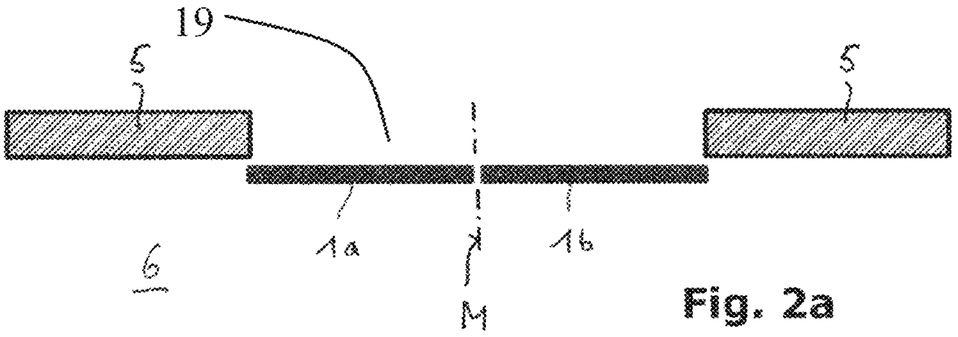
FIG. 2*a*: a diagrammatic horizontal sectional representation through the door system according to FIG. 1 in closed state.

In FIG. 2*a*, a diagrammatic view onto the sliding door system according to FIG. 1 is reproduced, and namely in a horizontal section through the representation according to FIG. 1, thus in a perpendicular top view onto a floor surface 6. Not diagrammatically drawn in further detail is a monitoring region 19, abstractly provided but spatially not necessarily limited, in which, by means of the mentioned sensor device 9, a monitoring with respect to an object situated in this region or moving in this region can occur. Here, this monitoring region does not have to be firmly defined, it can also represent a differently dimensioned monitoring region. This monitoring region includes a zone immediately before the actual door leaves 1*a*, 1*b*. Here, for the sake of simplicity, in FIG. 2, only one monitoring region with respect to one side of the sliding door leaf is shown, wherein, in principle, a corresponding second sensor device or a similar sensor device is also provided for monitoring the opposite side of the door system, namely in particular when public traffic from both sides in both directions is possible.

Figure 2B:
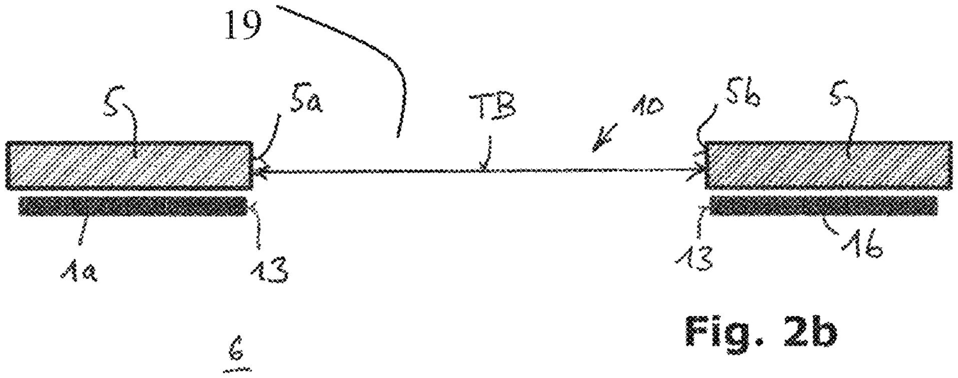
FIG. 2*b*: a representation corresponding to FIG. 2*a*, when the two door leaves are each 100% open.

In FIG. 2*b*, a representation corresponding to FIG. 2*a* is reproduced, but in a representation in which the two sliding door leaves 1*a* and 1*b* are adjusted in their maximum open position, that is to say 100% open, and more or less completely clear the actual door opening region 10. Thereby, the maximum door width is accessible in its maximum opening width, wherein, depending on the possible final position of the sliding door leaves 1*a* and 1*b* in their maximum open position this maximum door opening width is then formed between the two opposite main closing edges 13 facing one another and/or with respect to the front sides 5*a* and/or 5*b* facing one another of the wall sections provided laterally with respect to door region. Here, it is noted that the mentioned wall sections 5 can also consist of so-called fixed leaves which are not movable. Finally, it should also be noted already at this point that, instead of a two-leaf sliding door, a multiple-leaf sliding door can naturally also be considered, which, for example, includes two or respectively three left and/or right sliding door leaves which can be moved telescopically into one another.

Figure 3A:
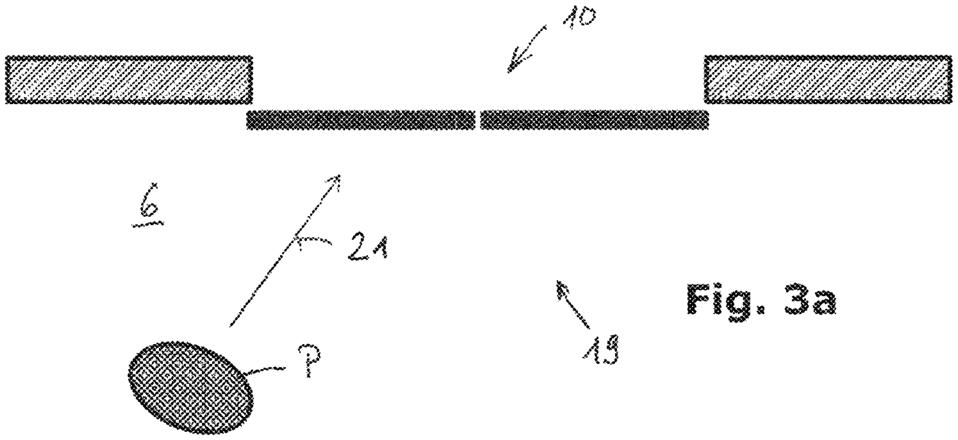
FIG. 3*a*: a representation similar to FIG. 2*a*, wherein a person approaches the door.
Figure 3B:
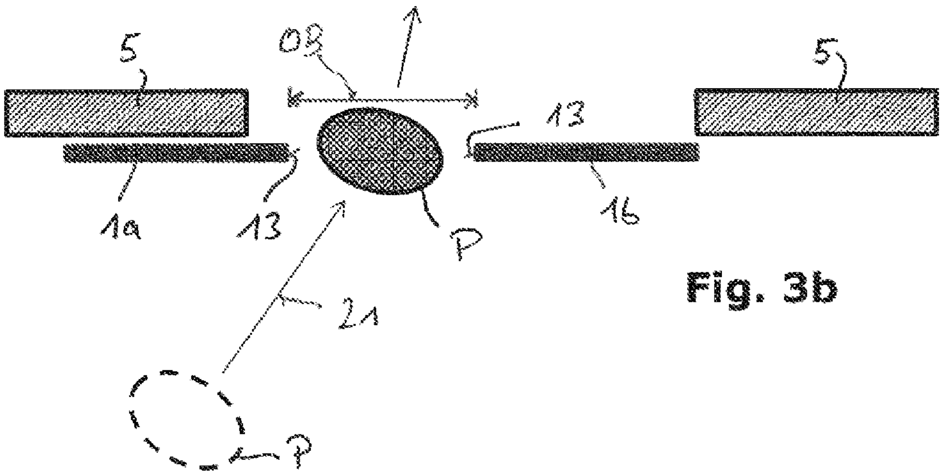
FIG. 3*b*: a representation temporally subsequent to FIG. 3*a*, when the person detected with the door still closed beforehand is passing through the door with leaves opened, and, namely, when the left leaf is merely only partially opened and the right door leaf is still completely closed.

On the basis of FIGS. 3*a* and 3*b*, a first possibility of how the sliding door drive according to the invention can be actuated is now shown.

Here, FIGS. 3*a* and 3*b* show the diagrammatic representation of a two-leaf sliding door drive in the region of a door opening 10.

In the possible monitoring region 19 abstractly indicated without further detail with respect to the bottom surface 6, a moving person P has now arrived in the detection region, that is to say, in the monitoring region 19, wherein the person P is also referred to in general below as object P. This person is indicated in a diagrammatic top view by an oval structure.

The sensor device is constructed so that not only the position of the object in question, that is to say of the person P in relation to the leaves, i.e., here in particular 1*a* and 1*b*, can be detected, but also the direction of movement 21 can be detected and determined. This direction of movement 21, in the further course of the movement toward the door, can always (slightly) change again and thereby also result overall in a curved path. This detection is preferably carried out by the sensors in a temporally continuous manner or at the smallest possible clocked time intervals.

In the embodiment example shown, the person in question or the object P in question in the position shown in FIG. 3*a* moves further toward the still closed door.

In FIG. 3*b* it is shown how this person P is now no longer situated in the position shown with dashed line but rather is now already in the immediate region of the door leaves 1*a*, 1*b*.

Since, in this embodiment example shown, the variable detected preferably at least approximately parallel to the door plane (corresponding to the door leaves and thus furthermore perpendicular to the surface of the floor 12) by the sensor device 9, i.e., in particular the diameter or width or in general the contour of the person P passing through the door, is smaller than half the door width, that is to say in other words smaller than the door leaf closed by the left door leaf 1*a* in the closed state, and, here, the position of the object P is furthermore such that the object P, when the left door leaf is open, wishes to move only through this door section without colliding with the right door leaf 1*b*, which is still in its closed position, at main closing edge 13 thereof, only the left door leaf 1*a* has now been moved by means of the control and/or evaluation device 11 and the associated drive device 7*a* into its open position.

Here, the left door leaf 1*a* overall can be moved into its 100% open position. However, in the scope of the invention, it is also possible that the left door leaf is moved, for example, only 95%, 90%, 85% or, for example, 83%, 82%, etc., into the open position, that is to say only to the extent that the opening region formed thereby is sufficiently large so that the person P in question can move through between the two door leaves in a collision-free manner.

Figure 3C:
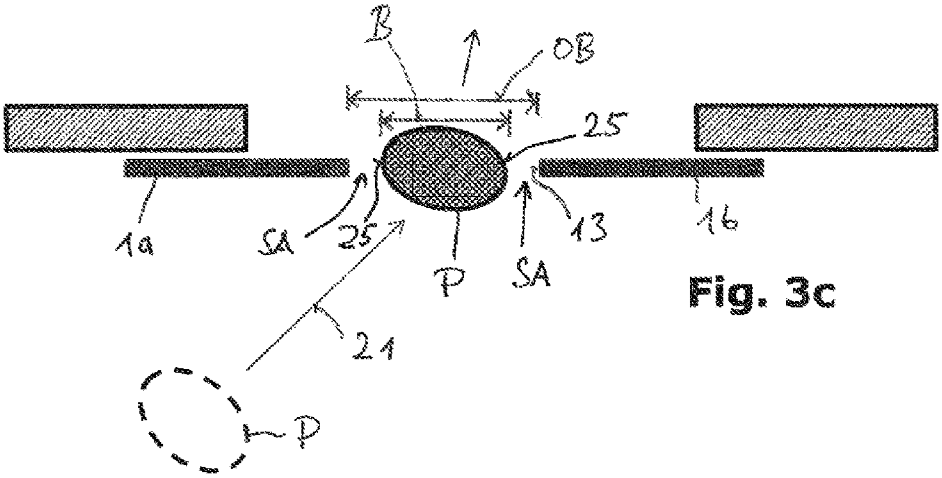
FIG. 3*c*: a representation deviating from FIG. 3*b*, in which the person walks only slightly off center through the door, so that the left and the right door leaves are moved to different extents into a partially open position.

On the basis of FIG. 3*c*, it is accordingly shown that, for example, the person P who in FIG. 3*a* is still remote with respect to the door, has moved along another direction of movement 21 toward the door in such a way that the person in question wishes to pass through the door slightly closer to the center position M compared to the embodiment example according to FIG. 3*b* (see also FIG. 2*a*).

In this case, by means of the sensor device 19 and the control and/or evaluation device 11, the two door leaves 1*a*, 1*b* would now be adjusted in the opening direction but in turn again only to the extent necessary to allow the person P in question to pass through the door in an unimpeded manner on the path 21 selected by the person in question themselves and thus in a collision-free manner.

In this embodiment example, the left door leaf 1*a* would be moved, for example, approximately into its 60% open position, whereas the right door leaf 1*b* now is only moved approximately into its 30% open position, so that the region between the two main closing edges 13 facing one another between the two leaves 1*a* and 1*b* is sufficiently large so that the person in question can pass through the door on this path in a collision-free manner. In this case, that is to say in the 60% open position of the left door leaf 1*a* and in the 30% open position of the right door leaf 1*b*, the entire door width TB would be overall 45% open, so that the actual opening region OB with respect to the total door width TB (FIG. 2*b*), in the end, is thus only 45%.

Here, by means of the control and/or evaluation device 11, the actuation of the door leaves can be carried out in such a manner that, proceeding from of the concrete path and the concrete position of the monitored object P and its width extension B (preferably measured parallel to the movement path of the door leaves or the plane of the door leaves), the door leaves are always moved in opening position to the extent that, for example, a safety and/or side spacing SA of in each case at least 10 cm, 15 cm or, for example, 20 cm, between the outermost or most lateral point 25 of the contour 23 of the object moving through the door and the respective adjacent main closing edge 13 of the respective door leaf 1*a*, 1*b*, is available as additional free space.

Figure 3D:
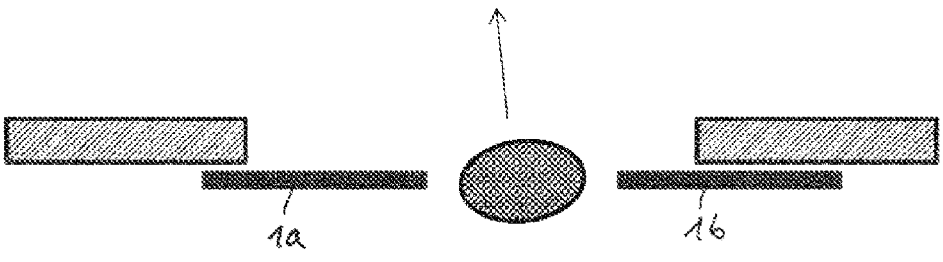
FIG. 3*d*: a representation similar to FIG. 3*c*, in which, however, a person or a moved object is moving through the two partially opened sliding door leaves, so that the right sliding door leaf is adjusted further into its partially open position than the left sliding door leaf which is moved only slightly in its open position.

On the basis of FIG. 3*d*, it is only shown that, in principle, the comparable actuation steps can be carried out if a corresponding object P approaches the sliding door system, for example, off center, i.e., wishes to pass through the door system predominantly in the region of the right door leaf 1*b*. The right door leaf 1*b* then opens to a greater extent than the left door leaf. However, in this embodiment example as well, the door control and the door opening as well as the degree of opening are carried out in an object-dependent manner, i.e., depending on the size, width (diameter) and/or contour of the object P moving through the door system or through the immediate door opening region 10 and depending on its direction of movement.

Figure 4A:
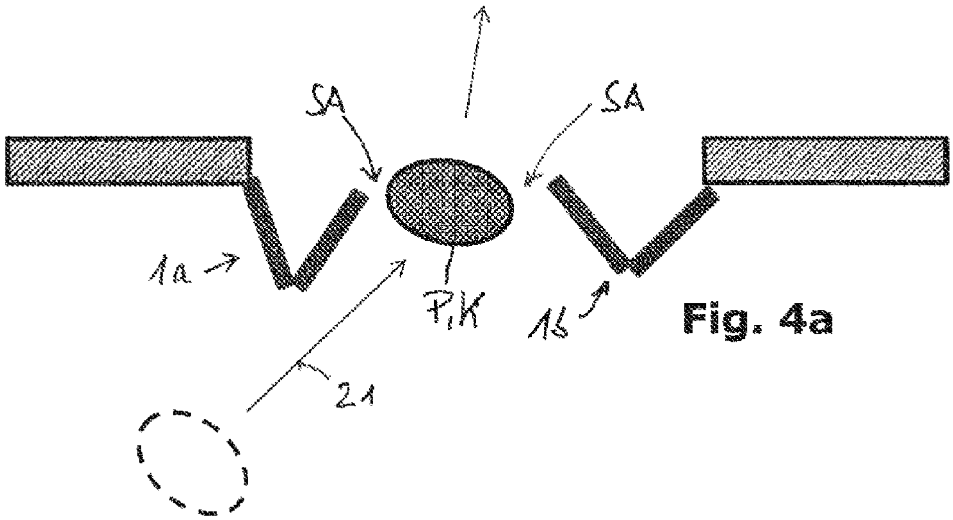
FIG. 4*a*: a representation similar to FIG. 3*a*, when not a sliding door system but a folding door system is used.

On the basis of FIG. 4*a*, it is only diagrammatically shown, deviating from the variant according to FIG. 3*b*, that the control method according to the invention for the operation of a door system applies not only to a sliding door system (with one or more leaves) but can just as well be used in a folding door system. Indeed, in the variant according to FIG. 4*a*, it can also be seen that, based on the specific direction of movement 21 toward the immediate door opening region 10, the two folding doors 1*a* and 1*b* are now moved to different extents into their open position, namely only to the extent that, taking into consideration a safety spacing (SA) between the most lateral points of the object P passing through the door and the main closing edges 13, precisely the path on which the person in question wishes to pass through the door system is cleared. Here too, the opening movement, on the one hand, and the width of the opening movement thus take place in an object-dependent manner, i.e., depending on the location or the direction of movement of the object P and its width, diameter or, in general, its contour K.

Figure 4B:
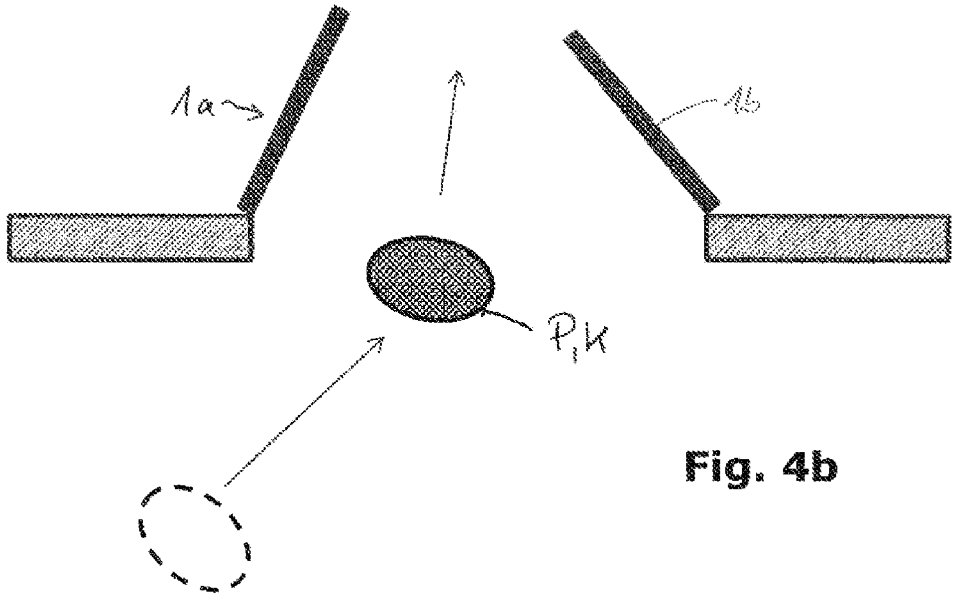
FIG. 4*b*: an additional variant to the extent that, instead of a sliding door or folding door system, a swing door system with, for example, two swing doors is used.

On the basis of FIG. 4*b*, only the analogue for the case in which a swing door system is used is shown, in which two swing door leaves 1*a* and 1*b* can be adjusted via vertical pivot axes with respect to the wall sections 5 from a closed position into an open position. In the variant according to FIG. 4*b*, the two swing door leaves 1*a*, 1*b* shown have been adjusted in the open position to the extent that, in an object-dependent manner depending on the size (that is to say the diameter or the contour of the object P) on the one hand and depending on its direction of movement 21 on the other hand, they are opened only to the extent that a sufficient opening width OB is available, so that the object P can pass through the swing door system in a collision-free manner.

Figure 5A:
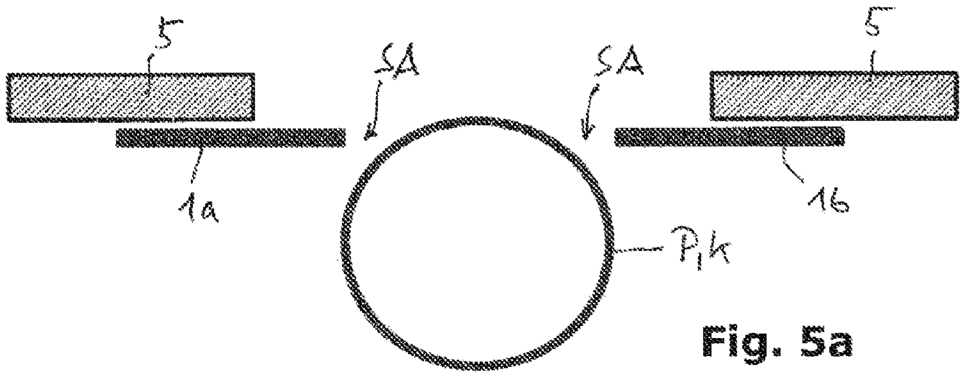
FIG. 5*a*-5*c*: an embodiment example according to the invention, in which an object passes through a door opening region and in the process the opening and the closing movement is carried out in an object-related manner, that is to say depending on the respective current width or size with which the object enters the door opening region or is located there.
Figure 5B:
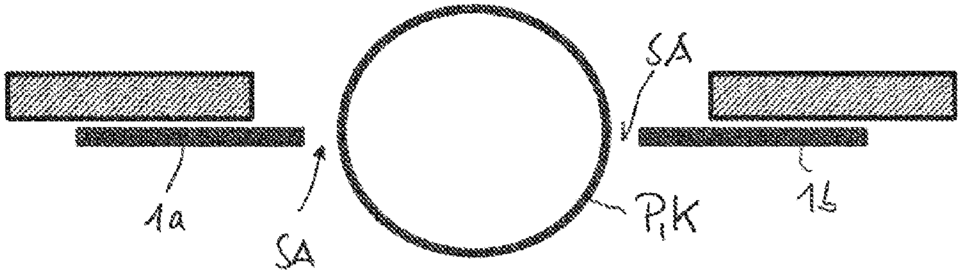
Figure 5C:
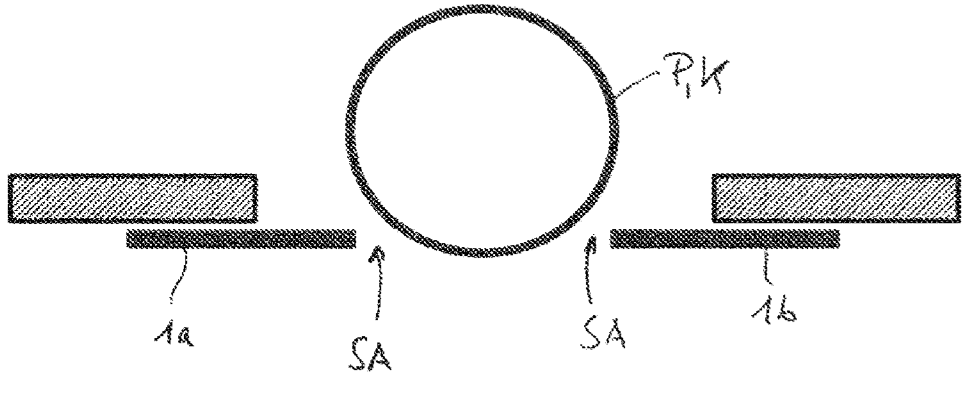

In FIGS. 5*a* to 5*c*, it is shown in three more precise detailed steps how the opening movement and/or the closing movement of a one-leaf or multiple-leaf door is carried out depending on the respective current width, size and/or contour or overall contour of the detected object with respect to the door opening region 10, which changes during the movement process through the door opening region.

In other words, the invention proposes that, in an at least one-leaf door, the door leaf is correspondingly moved, follows, or is readjusted depending on the relevant and/or effective width, size and/or contour or overall contour with respect to the door opening region of the detected object, which changes during the movement process through the door opening region. This can occur so that a preferably predeterminable lateral safety and/or side spacing SA between the object moving through the door and the main closing edge of the at least one door leaf is preferably maintained in each phase. Thus, the opening width of the door leaf (leaves) changes, for example, at least in sections during the movement of a person through the opening region of the door.

According to FIG. 5*a*, the object is just plunging into the door opening region 10. In FIG. 5*b*, the object is situated with its largest width exactly in the door opening region 10, wherein, in the representation according to FIG. 5*c*, it has already almost left the door opening region 10 and only part of the width thereof is still in the door opening region 10. Thus, the door leaves can correspondingly be actuated and/or follows both during the opening phase as well as in the closed phase or only in one of the two phases.

On the basis of the depiction, it can thus be seen that the door control should be carried out depending on the detected object in such a manner that the respective degree or the respective extent of the opening movement and/or the closing movement at least in a time and/or movement period occurs depending on the respective effective or current width, size and/or contour or overall contour with respect to the door opening region of an object moving through the door opening region. Here, as a rule, these respective effective or current width, size and/or contour or overall contour with respect to the door opening region change during the movement process of the object through the door opening region.

Therefore, in the scope of the invention, in particular when the door opening region is starting to be reached or entered, the opening movement of a door by at least one door leaf is allowed to end only when the object is already at least partially situated in the immediate door opening region of the at least one door leaf. Likewise, in the scope of the invention, when leaving the door opening region, it is possible to allow the closing movement of a door by at least one door leaf to start already when the object is still at least partially situated in the immediate door opening region of the at least one door leaf.

The above explained methods of operation and method steps are also used in all the other described embodiment examples.

In sliding doors, swing doors or folding doors, the door opening region 10 is located between the main closing edges. In one-leaf doors, the door opening region 10 is located between the main closing edge of one door leaf and the opposite section of the door frame.

Figure 6A:
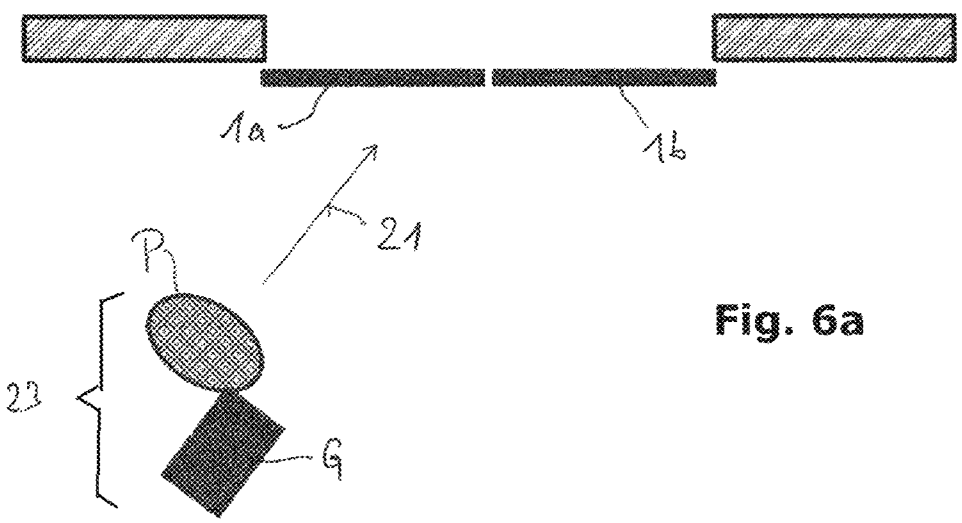
FIG. 6*a*: a representation similar to FIG. 3*a*, in which a person approaches a still closed sliding door, wherein the person is pulling a rolling suitcase behind on his/her right side.
Figure 6B:
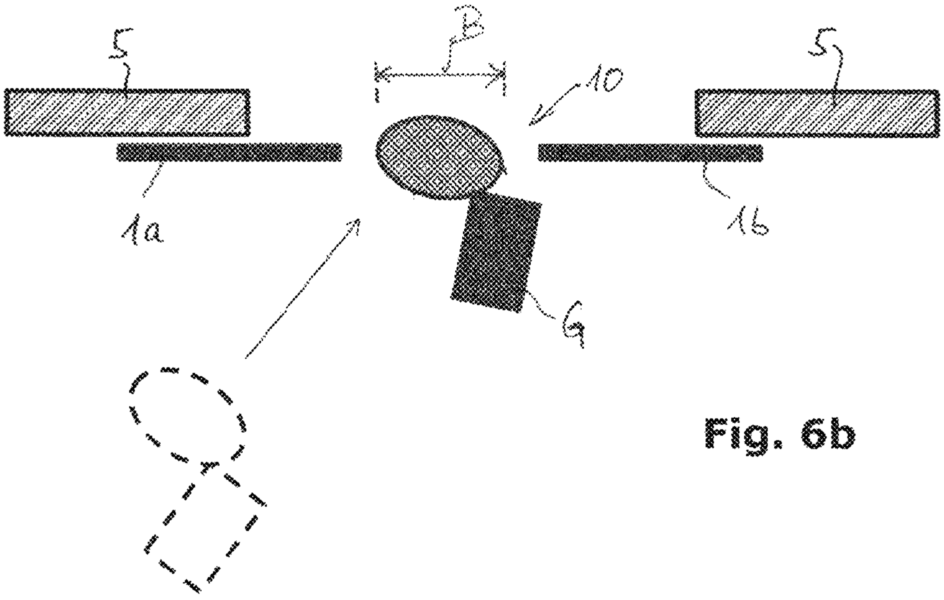
FIG. 6*b*: a representation corresponding to FIG. 6*a*, when, temporally subsequent to the representation according to FIG. 6*a*, the person has reached the immediate door opening plane of the two-leaf sliding door system, wherein the left door leaf is opened to a greater extent than the right door leaf.

On the basis of FIGS. 6*a* and 6*b*, it is now shown what the door control can look like in the scope of the invention, for example, in the case of a monitored object P comprising a more complex outer or overall contour 23.

In the representation according to FIG. 6*a*, it can be seen that now, similar to the variant according to FIG. 3*a*, a person has arrived in the monitoring region of the sensor device 9, said person pulling behind, for example, with the right hand, a suitcase equipped with rollers or object G, etc.

Thereby, an asymmetric overall contour 23 in direction of the direction of movement 21 results.

In the representation according to FIG. 6*b*, the detected object now has come closer to the actual door to the extent that the corresponding door leaves are situated depending on the direction of movement selected by the person in question, the relative position thereof with respect to the respective door leaf and the width extension B thereof in the region of the already open leaves 1*a*, 1*b*. In accordance with the position thereof and the width extension thereof, the two door leaves 1*a*, 1*b* have been c opened as a function thereof to the extent that, with the addition of the mentioned safety and/or side spacing SA, they have been deployed toward the respective main closing edge 13 of the leaf in question to the extent that that the person P can pass through the correspondingly adapted open leaves 1*a*, 1*b* in a collision-free manner. However, during the further passage, due to the complex (i.e., asymmetric) contour of the object P, the situation changes to the extent that the door leaves 1*a*, 1*b* now have to correspondingly follow the contour 23 that has varied.

Figure 6C:
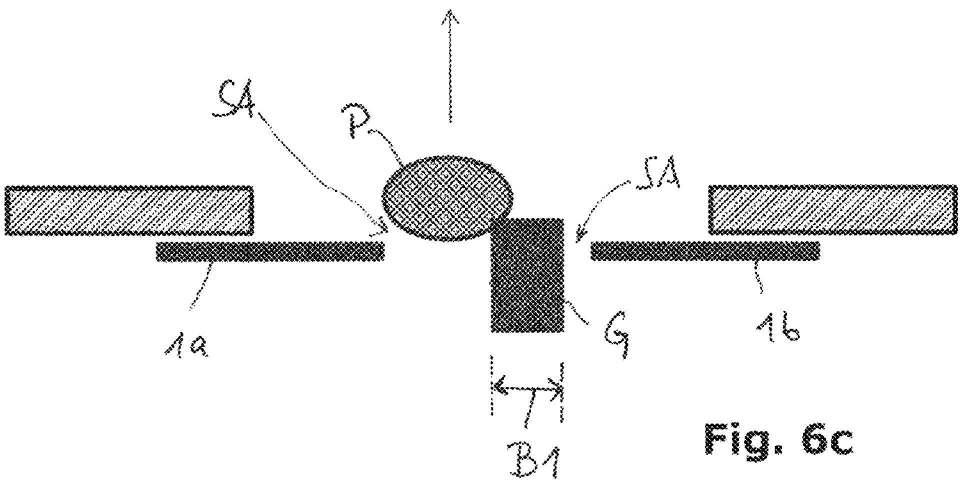
FIG. 6*c*: a representation of a situation temporally subsequent to FIG. 6*b*, in which a person has already almost completely walked through the sliding door system and only the suitcase is still situated in the region of the sliding door system, so that the left door leaf is already starting its closing movement.

Thus, now it is shown on the basis of FIG. 6*c* how the person P in question himself/herself has already passed almost completely through the door, while the suitcase G is still situated in the door opening region 10.

Since, due to the specific contour 23 and depending on the progressive extent to which the object P moves through the immediate door opening region 10 in which the door leaves can be adjusted between open and closed position, the actual width extension B1 of the object P to which the additional item or suitcase G also belongs now thus varies in the region of the movement path of the at least one leaf.

In the time period shown in FIG. 6*c*, the person P in question has already almost left the actual door opening region, so that, for example, the left door leaf 1*a* can already be moved again with respect to the representation according to FIG. 6*b* a bit further into the closed position, in order to be moved further during the further progress of the person P, while the right door leaf 1*b* still has to be moved further in its open position so that the suitcase G can also be moved through the door in a collision-free manner.

From this representation as well, one can see that, for example, while avoiding or circumventing a time control (as provided in the prior art), the closing movement of the differently actuated door leaves can already occur relatively promptly and immediately when more than 50% of the object in question has passed through the actual door opening region or door region 10. This too shows that the door closing movement can also occur in an object-dependent manner in the scope of the invention, that is to say depending on the location of the object, its direction of movement and/or its actual contour in the immediate movement region and/or region between the closing edges 13 of the respective door leaves.

Figure 6D:
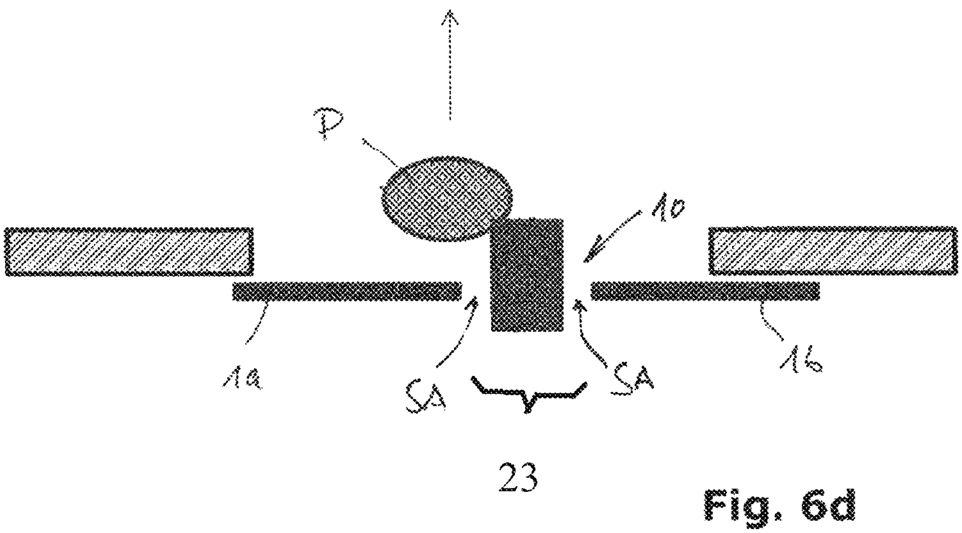
FIG. 6*d*: an additional situation temporally subsequent to FIG. 6*c*, in which the person already has completely walked through the space between the sliding doors and only the suitcase is still situated in the region of the plane of the sliding doors, and, for this purpose, the sliding doors are moved toward one another to the extent that substantially only sufficient space for the rolling suitcase in tow is still clear.

From the representation according to FIG. 6*d*, it can be seen that the actual person P now has already completely passed through the door opening region 10 so that, in the case of the position in question, the left door leaf 1*a* can then is already moved immediately into its 100% closed position, while the right door leaf 1*b* is still situated predominantly into its open position, since the suitcase G pulled behind by the person P is still situated in the opening region, i.e., in the region of the door opening 10.

During the further progress of the person P, in the scope of the invention, the right door leaf 1*b* can then be moved relatively promptly and directly into its closed position as soon as the pulled suitcase G has left the region of the door opening 10, in other words, the corresponding entire monitored object P is thus no longer situated in the region of the immediate door opening 10.

In other words, the separately actuatable door leaves 1*a*, 1*b* can thus be actuated so that they approximately effectively "follow" according to the respective outer or overall contour 23 of the detected object P. In other words, the two separately actuatable door leaves are always opened only minimally or as minimally as possible, that is to say to the extent that the detected object in question, depending on its specific contour situation, thus in the circumferential direction, is acquired parallel to the surface of the floor 6, and here the leaves 1*a*, 1*b* are open to the extent that, in a manner corresponding to the determined or detected contour 23, depending on the position in question and taking into consideration an additionally predeterminable safety or side spacing SA, the person can pass through the door opening on the path individually selected by the person.

On the basis of the preceding embodiment example according to FIGS. 6*a* to 6*d*, it is shown how, in the case of an effectively "complex overall contour" 23, the opening width of the door leaves 1*a*, 1*b* which always follow during the passage of the object P, G through the immediate door opening region 10, is thus adapted to the current width of the complex contour 23 and, after the complete passage of the object, can be closed again relative quickly in an object-dependent manner, that is to say not as in the prior art by means of a time control, as a rule after the lapse of a presettable time after the passage of a person through the door.

Figure 7A:
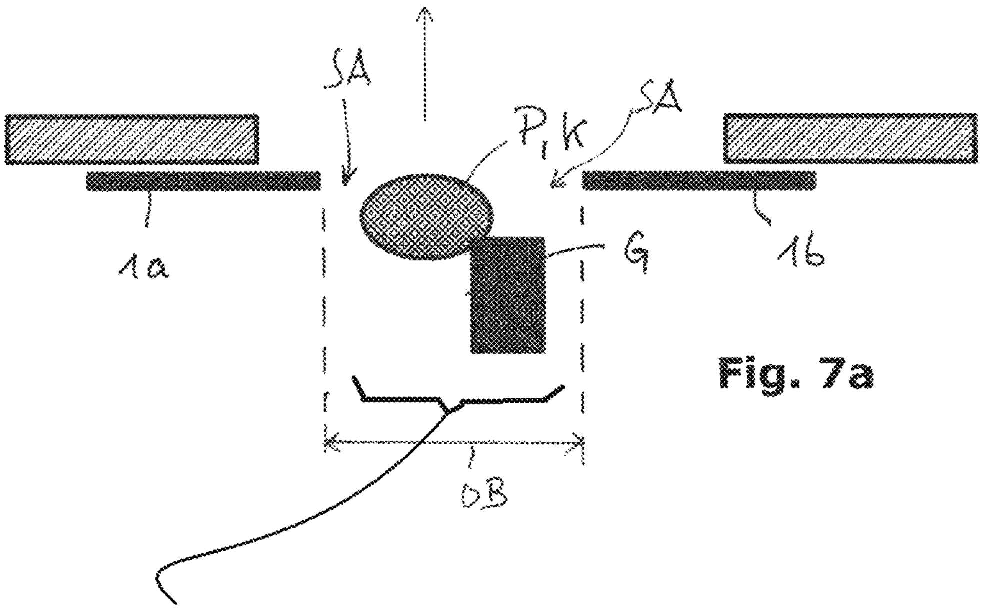
FIG. 7*a*: a door actuation deviating from the preceding embodiment example, wherein the two sliding doors, depending on the more complex object, during the starting time when the object optionally with a suitcase pulled behind it passes through the door, are moved into a relative maximum open position depending on the direction of movement and the position.
Figure 7B:
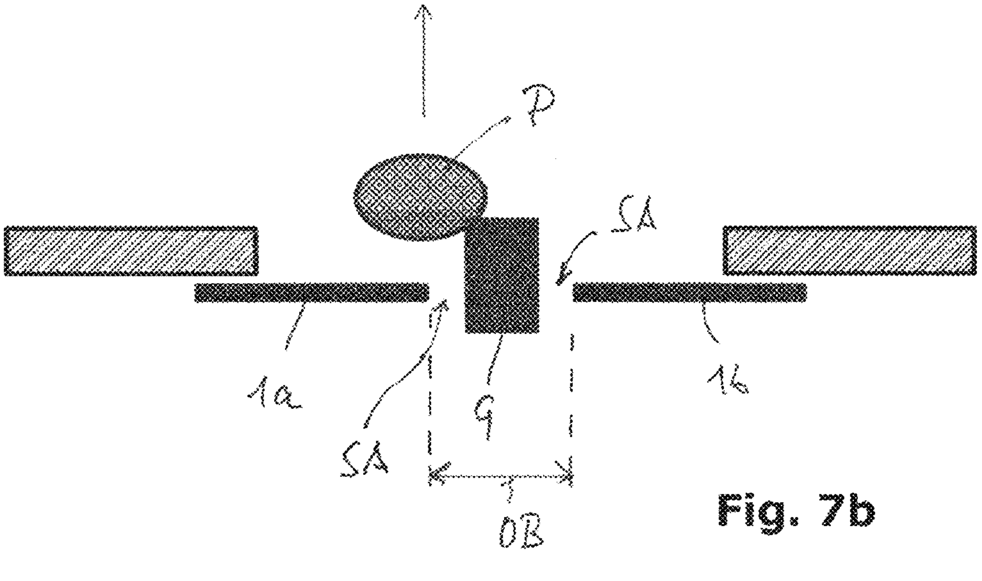
FIG. 7*b*: a representation temporally subsequent n to the situation according to FIG. 7*a*, in which only the sliding suitcase is still situated in the region of the plane of the door leaf, and the door leaves are moved closer to one another in the closing direction only when the remaining object, now of smaller width, leaves the door opening region.

In the variant according to FIGS. 7*a* and 7*b*, it is shown that, in the case of a complex overall contour 23, for example when a person or an object P asymmetrically pulls an object or suitcase G behind (in the variant according to FIGS. 7a and 7b on the right side), the overall width, that is to say the maximum overall width and position and direction of movement of the object P, G, can be acquired by the sensor device 9. Subsequently, the control according to the invention can be actuated so that the door leaves 1a, 1b are then adjusted in such a manner that, taking into consideration a safety and side spacing SA, the object P in question with the item G can pass through the door in a position-dependent and above all movement-dependent manner. In other words, the door leaves here too are optimally set individually and independently of one another depending on the object and the item and of the direction of movement thereof, so that a sufficient opening width OB is set, allowing the object to pass through the door in a collision-free manner.

However, in this case, the relevant optimal and maximum opening width OB in relation to the overall object is maintained only during the start of the passage through the door. If it is detected that the overall width of the object decreases because, as shown, for example, in FIG. 7b, the preceding portion of the object with larger overall width has already left the actual door opening region 10, then the closing movement of the door leaves or of the at least one door leaf, here the door leaf 1a, is already starting in adaptation to the currently changed, actually still remaining width of the object in the door opening region, as explained and shown in reference to FIG. 6d. Thus, an automatic adaptation to the effective width of the overall contour 23, which changes during further passage through the opened door, occurs.

Any intermediate actuations between the variant according to the embodiment example according to FIGS. 6a to 6d and FIGS. 7a and 7b are also possible, wherein a partial ongoing readjustment is thus possible, before the entire object P with item G has left the actual door opening region 10.

It has already been mentioned that the side spacing SA can automatically be differently set manually or by the control and evaluation device 11.

Figure 8A:
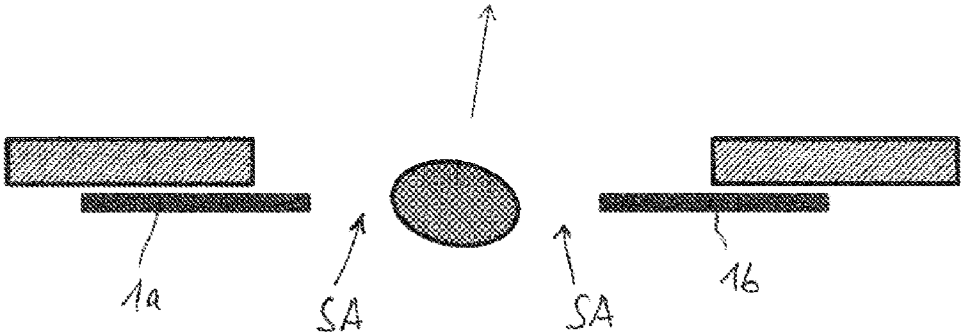
FIG. 8*a*: a representation similar to FIG. 3*c*, wherein, however, during the actuation according to FIG. 7*a*, the side or safety spacing between the main closing edges facing one another of the two door leaves and the object or person passing through the door system is selected to be larger or is settable and set automatically depending on at least one additional factor.

Thus, for example, based on FIG. 8a deviating from the variant according to FIG. 3c, it is shown that a considerably larger side spacing SA has been selected. As stated, this side spacing can be predetermined as desired or else automatically and differently set by the control device depending on certain other parameters.

Figure 8B:
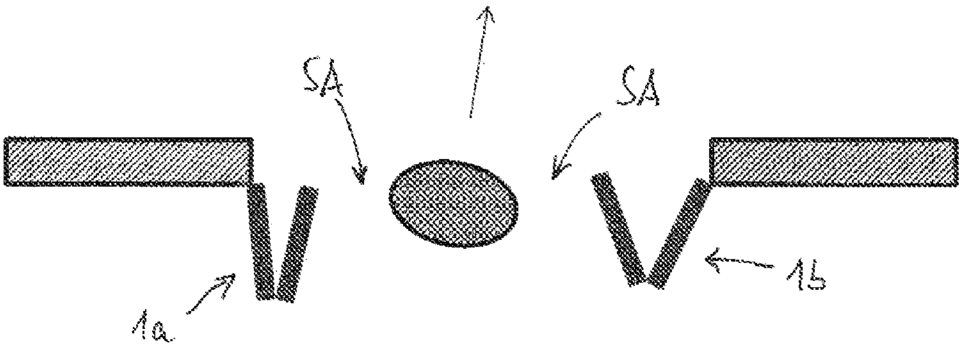
FIG. 8*b*: a corresponding representation similar to FIG. 8*a*, but in the case of the use of a folding door system instead of a sliding door system.

And this also applies in principle to all the mentioned door types, that is to say, for example, to sliding door systems as shown on the basis of FIG. 8a or, for example, also to folding door systems, in which a larger side spacing SA can also be set or predetermined by the system, as shown, for example, in the embodiment example according to FIG. 8b. Finally, this also applies to a swing door leaf drive as shown by the drawing in FIG. 4b. There too, the swing door leaves 1a, 1b shown on the basis of FIG. 4b could be adjusted further into the open position, in order to set the opening width OB and thus the side spacing SA larger. To that extent, there are no limitations with regard to a certain type of a door system.

However, in the example according to FIGS. 8a and 8b as well, the leaf position adaptation which follows in an object dependent manner occurs in a time or movement period during the phase of entry into the door opening region and/or in the phase of leaving the door opening region, as partially shown on the basis of FIGS. 5a to 5c or FIGS. 7a and 7b.

Furthermore, it is noted that the value of the safety or side spacing (SA) can be automatically set by the control unit, for example, in particular depending on the inside or outside temperature, that is to say the temperatures on both sides of the automatic door system. If the temperature difference between inside and outside temperatures is, for example, small, thus if there is no large temperature difference, the safety or side spacing (SA) can be selected to be larger in favor of the comfort of the object P. In the case of large temperature differences, for example, in summer when the outside temperature is high and the inside temperature is low, or in winter when the inside temperature is high and the outsider temperature is low, the safety or side spacing (SA) can be selected to be smaller in order to minimize the energy flow between the two sides of the automatic doors, that to say between the inside and outside regions, and thus to save energy.

Depending on such temperature conditions or temperature differences, it would also be possible to set when the opening movement of the door leaf (leaves) is started and when the closing movement of the door leaf (leaves) is already started. In the case of small temperature differences, for example, the door leaves can be moved already relatively early into the necessary open position, wherein the closing movement occurs, for example, later than in the embodiment examples explained above.

Furthermore, intelligent controls are also possible to the extent that, for example, a closing movement is not carried out when an additional object approaching the door is already detected relatively promptly in the monitoring region. Here, it can be estimated whether, for example, due to the closing and subsequent opening movement, more energy is consumed than, for example, during the prolonged opening phase, during which one waits until a second or next person has also passed through the door to finally close the door only then.

Figure 9A:
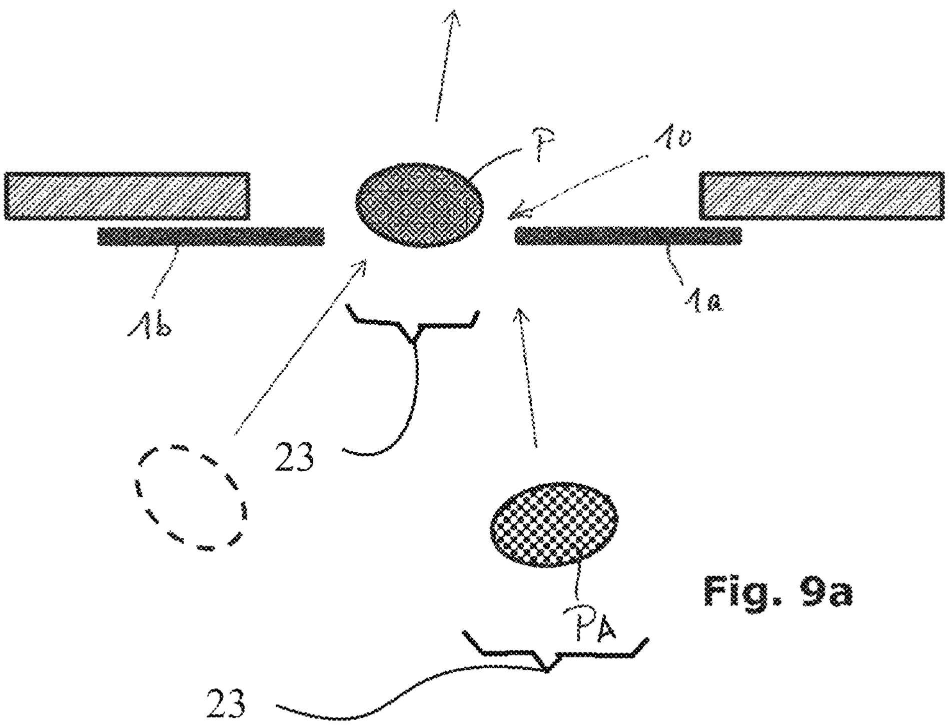
FIG. 9*a*: the representation of an intelligent door control, in which, after passage, for example, through the sliding door system, differently from the other embodiment examples, the sliding doors are not closed relatively quickly but kept open, since another object approaching the door is already detected.
Figure 9B:
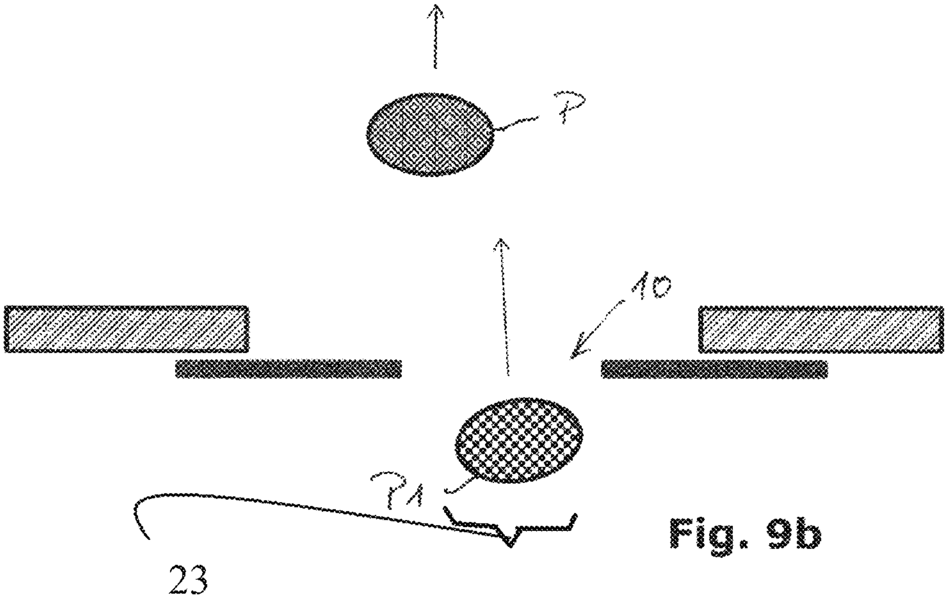
FIG. 9*b*: a situation temporally subsequent to the situation according to FIG. 9*a*, in which the sliding door leaves which are held open are still held open but have already been adjusted as to their position so that they clear the path precisely where the other detected object is moving.

This is shown, for example, on the basis of FIGS. 9a and 9b. In the situation according to FIG. 9a, a detected object P is already located immediately in the door opening region 10, so that, at this point in time, the door leaves 1a, 1b are moved into the open position in question. During the further progress, in one of the possible and conventional control steps, the sliding doors 1a, 1b are moved into their closed position, in order to then be opened again at the time of the detection of a following object P1 and in fact also again in an object-dependent manner. However, in the described case, the following object P1 and its direction of movement 21' are already detected sufficiently early so that, after the object P has left the immediate door opening region 10, the door leaves in principle remain open.

However, in the scope of the invention, it is possible (as additionally shown on the basis of FIG. 9b) that the door leaves are readjusted, i.e., in terms of their position and their opening width, so that they make available an opening region OB which, although in principle object-dependent, is additionally dependent on a following object P1, i.e., on its contour 23, that is to say its width, size or diameter as well as on its direction of movement. In the variant shown according to FIGS. 9a and 9b, the following object P1 approaches the door more to the right compared to the preceding object P, so that then, the already open door leaves 1a, 1b are moved from the position according to FIG. 9a into the position according to 8b and set in their spacing (between the main closing edges 13 facing one another) so that this spacing corresponds to the contour, width or size of the next object P1 plus a side spacing that is predetermined or automatically set by the system. In other words, a closed position of the door leaves between the time when the object P passes through the door and then the following object P1 passes through the door is avoided if desired.

The explained method can be used not only in the case of sliding doors but also, as mentioned and shown, for example, in telescopic sliding door installations, folding door installations or swing door systems including swing doors, wherein, for example, two or three telescopically cooperating left wings as well as two or three telescopically cooperating right door leaves are provided. Here, the advantage of the individual and mutually separate actuation of the individual door leaf devices becomes even clearer. Indeed, such doors usually have a very large door width, with respect to the contour of a human passing through the door.

The invention claimed is:

1. A method for operating an automatic door system with at least one movable, adjustable and/or pivotable door leaf, whereby an immediate door opening region with a door width can be cleared as well as closed, the automatic door system further comprising a control and evaluation device; and a sensor device, wherein the sensor device implements a monitoring region assigned to or disposed upstream of the leaves and wherein the sensor device detects objects which are situated within or moving into the monitoring region, the method comprising the steps of:

detecting by means of the sensor device or the control and evaluation device, an object or an object group situated in the monitoring region, wherein a position and direction of movement thereof are determined and wherein a width, size or contour or overall contour thereof is determined, calculating a safety and/or side spacing, wherein the safety and/or side spacing is determined based on at least one additional parameter, wherein the additional parameter includes one or more of a temperature, an energy consumption, a temperature difference between spaces separated from one another by the automatic door system, an object class, an object orientation, and a collision risk;

determining by the control and evaluation device an opening width of the at least one door leaf as a function of time, wherein the opening width depends on a current position and direction of movement of the detected object and the safety and/or side spacing, wherein a cross section of the object in the immediate door opening region is determined by the width, size and/or contour or overall contour and the current position of the detected object with respect to door opening region of the detected object plus the safety and/or side spacing, wherein the opening width changes as the current position changes during the progressive movement of the detected object through the door region, performing an opening of the at least one door leaf wherein the at least one door leaf is moved increasingly further in an opening direction so that the opening width varies with the cross section of the object at the current position passing through the immediate door opening region, and wherein the opening movement of the at least one door leaf first ends when the current position of the detected object is situated at least partially in the immediate door opening region of the at least one door leaf, and performing a closing of the at least one door leaf, wherein the at least one door leaf is moved increasingly further in a closing direction, so that the opening width varies with the cross section of the object at the current position passing through the immediate door opening region and wherein the closing movement of the at least one leaf starts when the current position of the detected object is still at least partially situated in the immediate door opening region of the at least one door leaf.

2. The method according to claim 1, wherein the at least one door leaf comprises a two-leaf door having at least two door leaves, wherein only one door leaf is opened when the detected object, on the basis of its the current position, orientation and direction of movement and its width and/or size and/or contour or overall contour, is moved toward the only one of the at least two door leaves, wherein the opening width between two opposite main closing edges of the two door leaves corresponds at least to the width, size and/or contour or overall contour of the cross section of the detected object at the current position plus two times the calculated safety and/or side spacing.

3. The method according to claim 2, wherein, during the passage of the detected object and/or a detected object group through the immediate opening region, the door leaves follow a current contour or a current overall contour of the detected object plus the safety and/or side spacing between the two main closing edges of the two door leaves.

4. The method according to claim 1, wherein the at least one door leaf comprises two or more with independently and/or mechanically connected door leaves.

5. The method according to claim 1, wherein the closing movement of the at least one door leaf after passage of the object through the immediate door opening region does not occur or occurs only partway up to the contour of the object plus the safety and/or side spacing of the object when an additional object or object group approaching the door opening region is detected by means of the sensor device.

6. The method according to claim 1, wherein the closing movement of the at least one door leaf after or during the passage of the detected object and/or object group through the immediate door opening region continues or accelerates to follow the contour or overall contour of the detected object or object group plus the safety and/or side spacing, and wherein a visual or acoustic signal is emitted when an additional object or object group approaching the immediate door opening region is detected by means of the sensor device.

7. The method according to claim 1, wherein the beginning of the opening movement or the beginning of the closing movement of the at least one door leaf depends on the current position, orientation, direction of movement, or speed of the detected object and on one or more predeterminable or measurable variables, wherein the variables include measured temperatures or energy demand calculations.

8. An automatic door system for operating a door comprising the at least one door leaf operated according to the method of claim 1, wherein the door system comprises:

the control and evaluation device; and the sensor device, wherein the control and evaluation device implements the monitoring region assigned to or disposed upstream of the at least one door leaf and wherein the sensor device detects the detected object or object group situated within or moving into the monitoring region, wherein the control and/or evaluation device determines the current position, the direction of movement, and the cross section and the opening width, and wherein the control and evaluation device performs the opening and the closing.

9. The apparatus according to claim 8, wherein the at least one door leaf comprises at least two door leaves, wherein a one of the two door leaves is opened when the detected objector group of objects moves toward the one of the at least two door leaves, wherein the opening width is between at least two main closing edges facing one another of the two door leaves, and wherein the opening width corresponds to the cross section of the detected object at the current position plus two times the calculated safety and/or side spacing.

10. The apparatus according to claim 8, wherein the at least one door leaf comprises two telescopically retractable and deployable door leaves, wherein the system further comprises two drive devices for moving respective ones of the door leaves, wherein the control and evaluation device is constructed so that, the performing the opening and/or the performing the closing depends on the current position and direction of movement and the cross section with respect to the door opening region of the detected object, wherein the cross section changes during the progressive movement process through the immediate door opening region, wherein the opening width corresponds to the cross section of the section of the object passing through the immediate door opening region as the function of time plus the safety and/or side spacing provided on each side of the object.

11. The apparatus according to claim 10, wherein the control and evaluation device is constructed so that, when the detected object passes through the immediate door opening region, the door leaves move in relation to the cross section of the detected object at the current position, wherein the control and evaluation device determines an object-related safety and/or side spacing between main closing edges of the door leaves adjacent to the detected object and wherein the opening width corresponds to the cross section of the detected object at the current position with respect to the door opening region between the two main closing edges of the two leaves plus the object-related safety and/or side spacing.

12. The apparatus according to claim 8, wherein at least one door leaf comprises two or more independently and/or mechanically connected leaves.

13. The apparatus according to claim 8, wherein the control and evaluation unit calculates the safety and/or side spacing based on at least one further additional parameter, wherein the at least one further additional parameter includes one or more of a temperature, an energy consumption, a temperature difference between spaces which are separated from one another by the automatic door system, an object class, an object orientation, and a collision risk.

14. The apparatus according to claim 8, wherein the control and evaluation unit is constructed so that a closing movement of the at least one door leaf after the passage of the detected object through the immediate door opening region is interrupted when an additional object and/or object group approaching the door region is detected by means of the sensor device.

15. The apparatus according to claim 8, wherein the control and evaluation unit is constructed so that the closing movement of the at least one door leaf after or during the passage of the detected object or object group through the immediate door opening region continues or is accelerated, and a visual or acoustic signal is emitted when an additional object and/or object group approaching the door opening region is detected by means of the sensor device.

16. The apparatus according to claim 8, wherein the control and evaluation device is constructed so that the beginning of the opening movement or the beginning of the closing movement of the at least one door leaf occurs depending on the position and/or the direction of movement and/or orientation of the detected object and depending on one or more predeterminable or measurable variables, wherein the variables include measured temperatures or energy demand calculations.

* * * * *